US012299383B2

(12) United States Patent
Li

(10) Patent No.: US 12,299,383 B2
(45) Date of Patent: May 13, 2025

(54) GENERATING MACHINE LEARNING PIPELINES USING NATURAL LANGUAGE AND/OR VISUAL ANNOTATIONS

(71) Applicant: Deere & Company, Moline, IL (US)

(72) Inventor: Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 303 days.

(21) Appl. No.: 17/939,549

(22) Filed: Sep. 7, 2022

(65) Prior Publication Data
US 2024/0078376 A1 Mar. 7, 2024

(51) Int. Cl.
G06F 40/169 (2020.01)
G06F 16/583 (2019.01)
G06F 40/30 (2020.01)

(52) U.S. Cl.
CPC .......... G06F 40/169 (2020.01); G06F 16/583 (2019.01); G06F 40/30 (2020.01)

(58) Field of Classification Search
None
See application file for complete search history.

(56) References Cited

U.S. PATENT DOCUMENTS

| 10,489,126 | B2 | 11/2019 | Kumar et al. | |
| 10,636,074 | B1* | 4/2020 | Bentley | G06F 3/041 |
| 11,221,833 | B1 | 1/2022 | Huang | |
| 2003/0138758 | A1 | 7/2003 | Burstein et al. | |
| 2014/0019905 | A1* | 1/2014 | Kim | G06F 3/04883 715/780 |
| 2020/0285910 | A1* | 9/2020 | Steelberg | G06F 18/285 |
| 2020/0364456 | A1* | 11/2020 | Tran | G06Q 50/02 |
| 2021/0142097 | A1* | 5/2021 | Zheng | G06V 10/761 |
| 2022/0130499 | A1* | 4/2022 | Zhou | G06V 10/25 |

OTHER PUBLICATIONS

Yin et al., "A Syntactic Neural Model for General-Purpose Code Generation" arXiv:1704.01696v1 [cs.CL] 14 pages, dated Apr. 6, 2017.
Chakraborty et al., "On Multi-Modal Learning of Editing Source Code" arXiv:2108.06645v1 [cs.SE] 13 pages, dated Aug. 15, 2021.

(Continued)

Primary Examiner — Stella L. Woo
(74) Attorney, Agent, or Firm — Fenwick & West LLP

(57) ABSTRACT

Implementations are disclosed for automatically generating computer code that implements a machine learning-based processing pipeline based on multiple different modalities of input. In various implementations, one or more annotations created on a demonstration digital image to annotate one or more visual features depicted in the demonstration digital image may be processed to generate annotation embedding(s). Natural language input describing one or more operations to be performed based on the one or more annotations also may be processed to generate one or more logic embeddings. The annotation embedding(s) and the logic embedding(s) may be processed using a language model to generate, and store in non-transitory computer-readable memory, target computer code. The target computer code may implement a machine learning-based processing pipeline that performs the one or more operations based on the one or more annotations.

20 Claims, 9 Drawing Sheets

(56) References Cited

OTHER PUBLICATIONS

Bob Yirka "Codex, an AI system that translates natural language to programming code" Tech Explore. Retreived from https://techxplor.com/news/2021-08-codex-ai-natural-language-code.html. 2 pages, dated Aug. 12, 2021.
Chen et al., "Evaluating Large Language Models Trained on Code" arXiv:2107.03374v2 [cs.LG] 35 pages, dated Jul. 14, 2021.
App Design 101—AppSheet Help. Retrieved from https://support.google.com/appsheet/answer/10099795. 8 pages, dated Jul. 27, 2022.
Zareian et al., "Open-Vocabulary Object Detection Using Captions" arXiv:2011.10678v2 [cs.CV] 12 pages, dated Mar. 14, 2021.
"7 Tools to Help You Build an App Without Writing Code" Retrieved from https://blog.producthunt.com/7-tools-to-help-you-build an-app-without-writing-code-cb4eb8cfe394. 13 pages, dated Apr. 19, 2016.

\* cited by examiner

GENERATING MACHINE LEARNING PIPELINES USING NATURAL LANGUAGE AND/OR VISUAL ANNOTATIONS

BACKGROUND

Designing and implementing complex, machine learning-based data processing pipelines typically requires a significant amount of engineering effort, as well as expertise in data science and computer programming. These requirements raise significant barriers to entry in industries where such expertise is uncommon, such as in the agricultural industry where growers may still rely on human-based phenotyping of their crops. However, with the rise of precision agriculture—enabled at least in part by increased capability, availability, and affordability of agricultural robots, unmanned aerial vehicles (UAVs), and modular sensor packages—machine learning-based phenotyping has become increasingly crucial to remain competitive.

SUMMARY

Implementations are described herein for automatically generating, without explicit and/or manual computer programming, a machine learning (ML)-based processing pipeline. More particularly, but not exclusively, implementations are described herein for automatically generating computer code that implements a ML-based processing pipeline based on multiple different modalities of input, such as natural language input, digital image(s), and/or annotation(s) of the digital images. Techniques described herein enable individuals who lack expertise in programming and/or data science to nonetheless create relatively complex ML-based processing pipelines (alternatively referred to as "ML-based state machines") for drawing inferences from digital images. For example, agricultural personnel may be able to intuitively generate inferences about crops, such as crop yield predictions, fruit statistics, etc., by drawing annotations on digital images depicting the crops, and describing the operations they want performed based on those annotations (e.g., "show me a count of these fruit across all my fields").

In various implementations, a method may be implemented using one or more processors and may include: processing one or more annotations created on a demonstration digital image to generate one or more annotation embeddings, wherein the one or more annotations annotate one or more visual features depicted in the demonstration digital image; processing natural language input describing one or more operations to be performed based on the one or more annotations to generate one or more logic embeddings; and processing the one or more annotation embeddings and the one or more logic embeddings using a language model to generate, and storing in non-transitory computer-readable memory, target computer code; wherein the target computer code implements a machine learning (ML)-based processing pipeline that performs the one or more operations based on the one or more annotations.

In various implementations, the method may include causing the target computer code to be executed to carry out the one or more operations described in the natural language input. In various implementations, the language model comprises a multi-modal transformer. In various implementations, the one or more annotation embeddings and the one or more logic embeddings are processed by the language model as a sequence of embeddings.

In various implementations, the one or more annotations comprise one or more bounding boxes drawn on the demonstration digital image, and processing the one or more annotations comprises processing pixels of the demonstration digital image contained within the one or more bounding shapes to generate, as one or more of the annotation embeddings, one or more visual feature embeddings representing the visual features depicted by the pixels contained within the one or more bounding shapes.

In various implementations, processing the one or more annotations comprises encoding a spatial dimension and location of a bounding shape as one of the annotation embeddings. In various implementations, the one or more annotations comprise two reference points of the demonstration digital image that correspond to two of the visual features depicted in the demonstration digital image, and the one or more operations comprise determining a distance between the two of the visual features depicted in the demonstration digital image that are referenced by the two reference points. In various implementations, two reference points are annotated using a line drawn between them.

In various implementations, the one or more annotations comprise: a first bounding shape surrounding an instance of a first object class depicted in the demonstration digital image, and a second bounding shape surrounding an instance of a second class depicted in the demonstration digital image; wherein the one or more operations comprise identifying additional instances depicted in one or more digital images that are members of a union or intersection of the first and second object classes.

In various implementations, the one or more annotations comprise a bounding shape surrounding a first instance of a plant-part-of-interest depicted in the demonstration digital image, and the one or more operations comprise: detecting one or more additional instances of the plant-part-of-interest across one or digital images, and annotating the detected additional instances of the plant-part-of-interest with additional bounding shapes. In various implementations, the one or more operations further comprise determining a statistic about the additional instances of the plant-part-of-interest based on spatial dimensions of the additional bounding shapes. In various implementations, detecting the one or more additional instances of the plant-part-of-interest across one or more digital images comprises: encoding pixels of the demonstration digital image contained within the bounding shape that depict the first instance of the plant-part-of-interest as a first visual feature embedding; calculating similarity measures between the first visual feature embedding and a plurality of candidate visual feature embeddings that encode pixels contained in a plurality of candidate bounding shapes annotating the one or more digital images; and based on the similarity measures, identifying one or more of the candidate bounding shapes as surrounding the one or more additional instances of the plant-part-of-interest.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
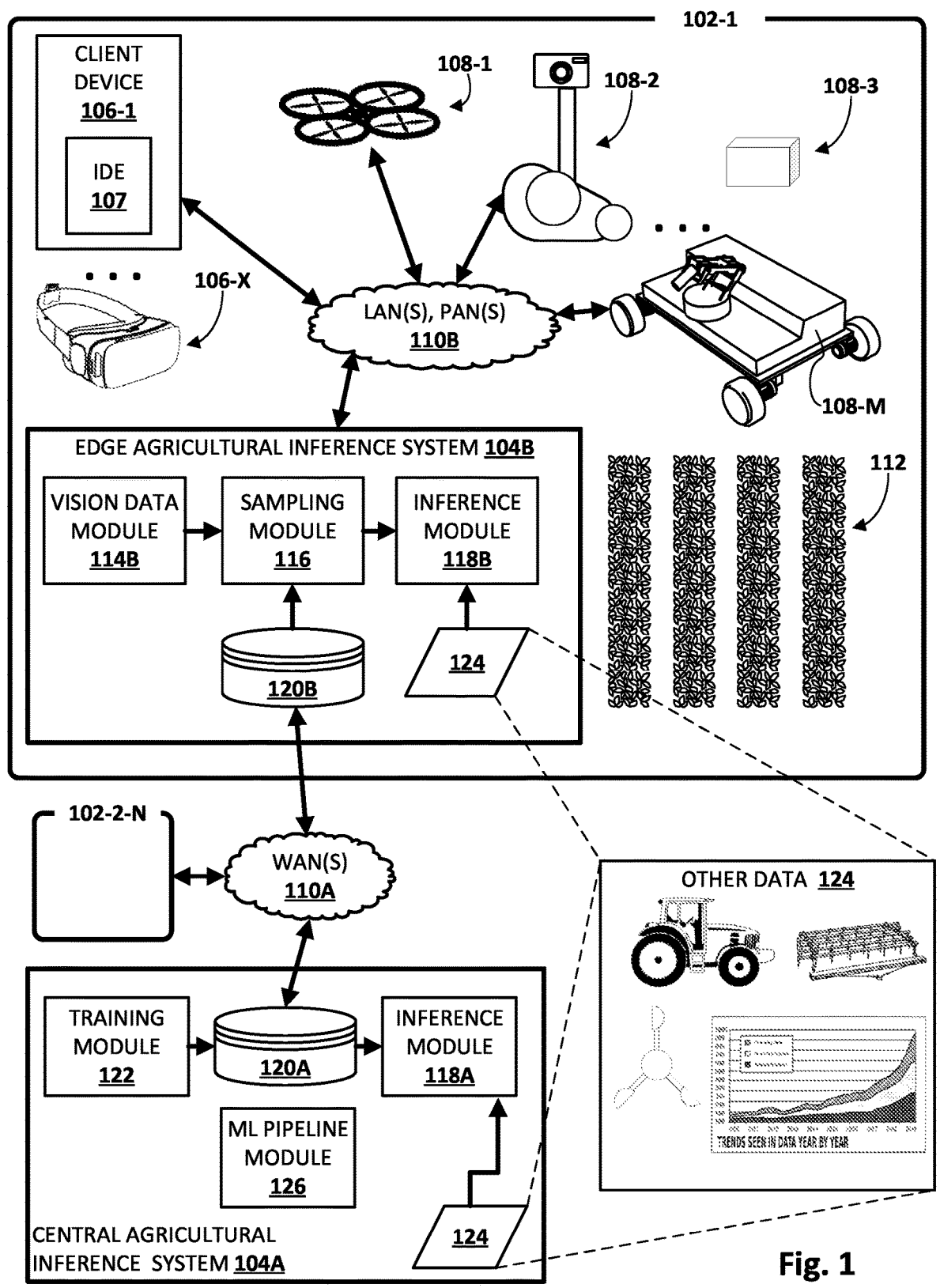
FIG. 1 schematically depicts an example environment in which disclosed techniques may be employed in accordance with various implementations.

Implementations are described herein for automatically generating, without explicit and/or manual computer programming, a machine learning (ML)-based processing pipeline. More particularly, but not exclusively, implementations are described herein for automatically generating computer code that implements a ML-based processing pipeline based on multiple different modalities of input, such as natural language input, digital image(s), and/or annotation(s) of the digital images.

Techniques described herein enable individuals who lack expertise in programming and/or data science to nonetheless create relatively complex ML-based processing pipelines (alternatively referred to as "ML-based state machines") for drawing inferences from digital images. For example, agricultural personnel may be able to intuitively generate inferences about crops, such as crop yield predictions, fruit statistics, etc., by drawing annotations on digital images depicting the crops, and describing the operations they want performed based on those annotations (e.g., "show me a count of these fruit across all my fields"). In some implementations, these ML-based processing pipelines may be generated ad hoc in real time or near real time.

In various implementations, an individual may create a "demonstration" digital image by adding annotation(s) to an existing digital image depicting object(s) of interest, such as crops, fields, etc. These annotation(s) may take various forms, such as various bounding shapes (boxes, circles), other drawing primitives such as lines, arrows, curves, handwritten text, etc. The individual may also provide (e.g., speak, type, or write on a screen using a finger or stylus) natural language input describing, directly or indirectly, one or more operations that the individual wants performed based on the individual's annotations contained in the demonstration digital image.

A direct description of the desired operations may describe the operations to be performed based on the annotation(s) explicitly. One example of a direct description would be, for instance, "perform object detection to detect other instances of this type of fruit shown in the images and draw boxes around those detected instances." An indirect description of the desired operations to be performed based on the annotation(s) may not directly describe the operations, but instead may convey information (e.g., desired results) from which the operations can be inferred. One example of an indirect description would be, for instance, "How many of these do you see in the images?"

In various implementations, the annotation(s) may be processed (e.g., encoded) to generate annotation embedding(s). Likewise, the natural language input may be processed (e.g., encoded) to generate logic embedding(s). The annotation and logic embeddings may be processed, e.g., as a sequence, using various types of ML models, such as a large language model trained specifically on corpuses of data related to computer-programming and ML-based processing pipelines. In various implementations, the large language model may include or take the form of, for instance, a multi-modal transformer network, an autoregressive language model, etc. Based on this processing, target computer code may be generated, stored in memory, and in some instances, executed in real time to provide the individual with the results they requested.

The target computer code may implement a ML-based processing pipeline that performs the operation(s) described in the natural language input, based on the individual's annotation(s). The target computer code may take various forms. In some implementations, the target computer code may be in the form of a high-level programming language such as Python, Java, C, C++, etc., that requires compilation to be executed. In other implementations, the target computer code may be in a form that is already or nearly executable, such as machine-level code, bytecode, command language script, etc.

As noted previously, the annotation(s) may include bounding shapes, such as bounding boxes, that are drawn or otherwise created by the individual. These annotation(s) may be used by the individual, for instance, to define area(s) of a demonstration image that contain visual features in which the individual is interested. Once these area(s) are defined, the individual can request that other similar areas having similar visual features be found. For example, the individual can draw a bounding shape around a fruit, and then ask, "how many of these are detected in my field" In some implementations, if an object (e.g., a strawberry) is detected within the individual-defined area, the object's classification may be used to retrieve a pretrained ML model that is configured to identify objects of that class.

However, it is not necessary to have a pretrained classification or object detection model in every instance. For example, the individual may define an area that contains pixels depicting visual features for which there is no pretrained ML model available (e.g., because such a model doesn't exist or is outside the individual's subscription). An embedding may be generated from those enclosed pixels, and may represent, in reduced dimensionality form, visual features depicted by those enclosed pixels. This embedding may then be used to search for similar embeddings generated from other portions of images.

For example, portions of images-of-interest may be randomly enclosed in auto-generated bounding shapes, candidate embeddings may be generated from those enclosed pixels, and then the embedding created by the individual can be compared to those candidate embeddings, e.g., using similarity measures like cosine similarity, dot product, Euclidean distance, etc. Based on these similarity measures, candidate embeddings representing pixels most similar to what the individual enclosed in the bounding shape may be identified. In other implementations, open vocabulary searching may be employed to detect previously unseen classes.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. However, this is not meant to be limiting. Techniques described here may be useful in any domain that would benefit from allowing experts and non-experts alike to be able to create machine learning state machines.

For example, scientists and researchers deployed in remote locations such as in space, in the Antarctic, in remote jungle regions, etc., may be experts in fields like physics, biology, chemistry, etc. However, they may only have surface-level understanding of how machine learning works. With techniques described herein, however, these scientists and researchers can create their own ML-based processing pipelines, e.g., by providing annotated image input accompanied by natural language input describing operations they'd like performed based on the annotated imagery. As another example, techniques described herein may be used to allow users to annotate satellite imagery and request various information and/or inferences. For example, a user could draw a box around a particular house depicted in a satellite image, and then request that other similar houses (e.g., similar price, similar square footage, similar yards, similar schools, etc.) be identified, tallied into a list, etc.

The environment of FIG. 1 includes a plurality of edge sites 102-1 to 102-N (e.g., farms, fields, plots, or other areas in which crops are grown) and a central agricultural inference system 104A. Additionally, one or more of the edge sites 102, including at least edge site 102-1, includes edge-based computing resources. For example, edge side 102-1 includes an edge agricultural inference system 104B, a plurality of client devices 106-1 to 106-X, human-controlled and/or autonomous farm equipment 108-1 to 108-M, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth.

One edge site 102-1 is depicted in detail in FIG. 1 for illustrative purposes. However, as demonstrated by additional edge sites 102-2 to 102-N, there may be any number of edge sites 102 corresponding to any number of farms, fields, or other areas in which crops are grown, and for which agricultural inferences such as crop yield predictions may be of interest. Each edge site 102 may include similar or different edge computing resources as those depicted in FIG. 1 as part of edge site 102-1.

In various implementations, components of edge sites 102-1 to 102-N and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site 102-1, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise a non-limiting example of a distributed computing network on which techniques described herein may be implemented. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 and some farm equipment 108 may operate a variety of different applications that may be used, for instance, to design ML-based processing pipelines and/or to obtain and/or analyze various agricultural inferences (real time and delayed) that were generated therefrom. For example, a first client device 106-1 operates integrated development environment (IDE) 107 (e.g., which may be standalone or part of another application, such as part of a web browser). Another client device 106-X may take the form of an HMD that is configured to render 2D and/or 3D data to a wearer as part of a VR immersive computing experience. For example, the wearer of client device 106-X may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment 108-1 to 108-M may take various forms. Some farm equipment 108 may be operated at least partially autonomously, and may include, for instance, an unmanned aerial vehicle (UAV) 108-1 that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot 108-M, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor 108-2, may be autonomous, semi-autonomous, and/or human driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes 108-3. An edge computing node 108-3 may be a modular and/or portable data processing device and/or sensor package that, for instance, may be carried through an agricultural field 112, e.g., by being mounted on another piece of farm equipment (e.g., on a boom affixed to tractor 108-2 or to a truck) that is driven through field 112 and/or by being carried by agricultural personnel. Edge computing node 108-3 may include logic such as processor(s), application-specific integrated circuits (ASICs), field-programmable gate arrays (FPGA), etc., configured with selected aspects of the present disclosure to capture and/or process various types of sensor data to make agricultural inferences.

In some examples, one or more of the components depicted as part of edge agricultural inference system 104B may be implemented in whole or in part on a single edge computing node 108-3, across multiple edge computing nodes 108-3, and/or across other computing devices, such as client device(s) 106. Thus, when operations are described herein as being performed by/at edge agricultural inference system 104B, it should be understood that those operations may be performed by one or more modular edge computing nodes 108-3, and/or may be performed by one or more other computing devices at the edge 102, such as on client device(s) 106 or other farm equipment 108.

In various implementations, edge agricultural inference system 104B may include a vision data module 114, a sampling module 116, and an edge inference module 118B. Edge agricultural inference system 104B may also include one or more edge databases 120B for storing various data used by and/or generated by modules 114, 116, and 118B, such as vision and/or other sensor data gathered by farm equipment 108-1 to 108-M, agricultural inferences, machine learning models that are applied and/or trained using techniques described herein to generate agricultural inferences, data indicative of ML-based processing pipelines generated using disclosed techniques, and so forth. In some implementations one or more of modules 114, 116, and/or 118B may be omitted, combined, and/or implemented in a component that is separate from edge agricultural inference system 104B.

Central agricultural inference system 104A is an example of cloud-based computing resources as it may be implemented across one or more computing systems that may be referred to as the "cloud." Central agricultural inference system 104A may receive massive sensor data generated by farm equipment 108-1 to 108-M (and/or farm equipment at other edge sites 102-2 to 102-N) and process it using various techniques, including but not limited to application of ML-based processing pipelines generated using techniques described herein, to make agricultural inferences.

In some implementations, sampling module 116 may be configured to sample, e.g., from one or more sensors onboard one or more farm equipment 108-1 to 108-M, or from vision data provided by vision data module 114, sensor data. Sampling module 116 may provide this sampled sensor data to edge inference module 118B. In some implementations, the sensor data may be processed, e.g., continuously, periodically, on demand, etc., by edge inference module 118B, using one or more ML-based processing pipelines stored in edge database 120B to generate output requested by one or more users.

Edge agricultural inference system 104B may process the inference data at the edge using one or more of the machine learning models stored in database 120B, e.g., based on an ML-based processing pipeline designed by a user using IDE 107 and techniques described herein. In some cases, one or more of these machine learning model(s) may be stored and/or applied directly on farm equipment 108, such as modular edge computing node 108-3, to make a targeted inference about plants of the agricultural field 112.

Various types of machine learning models may be used to generate ML-based processing pipelines as described herein and may be applied by inference modules 118A/B to generate crop yield predictions (real time and delayed). Additionally, various types of machine learning models may be used to generate image embeddings that are applied as input across the various machine learning models. These various models may include, but are not limited to, recurrent neural networks (RNNs), long short-term memory (LSTM) networks (including bidirectional), gated recurrent unit (GRU) networks, graph neural networks (GNNs), transformer networks, feed-forward neural networks, convolutional neural networks (CNNs), support vector machines, random forests, decision trees, etc.

Training module 122 may be configured to train various machine learning models described herein. These models may include those stored in database 120A, such as object instance recognition models, plant health classifiers, etc., as well as other machine learning models that are employed to encode various modalities of input data into embeddings and/or generate ML-based processing pipelines based on those embeddings.

In various implementations, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

In this specification, the term "database" and "index" will be used broadly to refer to any collection of data. The data of the database and/or the index does not need to be structured in any particular way and it can be stored on storage devices in one or more geographic locations. Thus, for example, database(s) 120A, 120B, and any other database or index mentioned herein may include multiple collections of data, each of which may be organized and accessed differently.

ML pipeline module 126 may be configured to implement selected aspects of the present disclosure to facilitate multimodal generation of ML-based processing pipelines using modalities such as natural language, images, and/or image annotations. In various implementations, a user may operate IDE 107 to provide natural language input, demonstration image(s), and/or image annotations. These various data may be provided to and processed by ML pipeline module 126 as described herein to generate ML-based processing pipelines.

While IDE 107 may resemble a traditional textual and/or visual programming environment in many cases, that is not required. Given that users are able to define ML-based processing pipelines using the aforementioned modalities, without needing to provide or edit source code, IDE 107 may be presented as a graphical user interface (GUI) on which a user is able to annotate demonstration images and/or provide natural language input. The natural language input may be spoken, typed, or even drawn on a touch screen using a finger or stylus. In the case of spoken input, ML pipeline module 126 or another component on client device 106-1 or agricultural inference system 104 may perform speech-to-text (STT) processing to generate text recognition output corresponding to the words spoken by the user.

Figure 2:
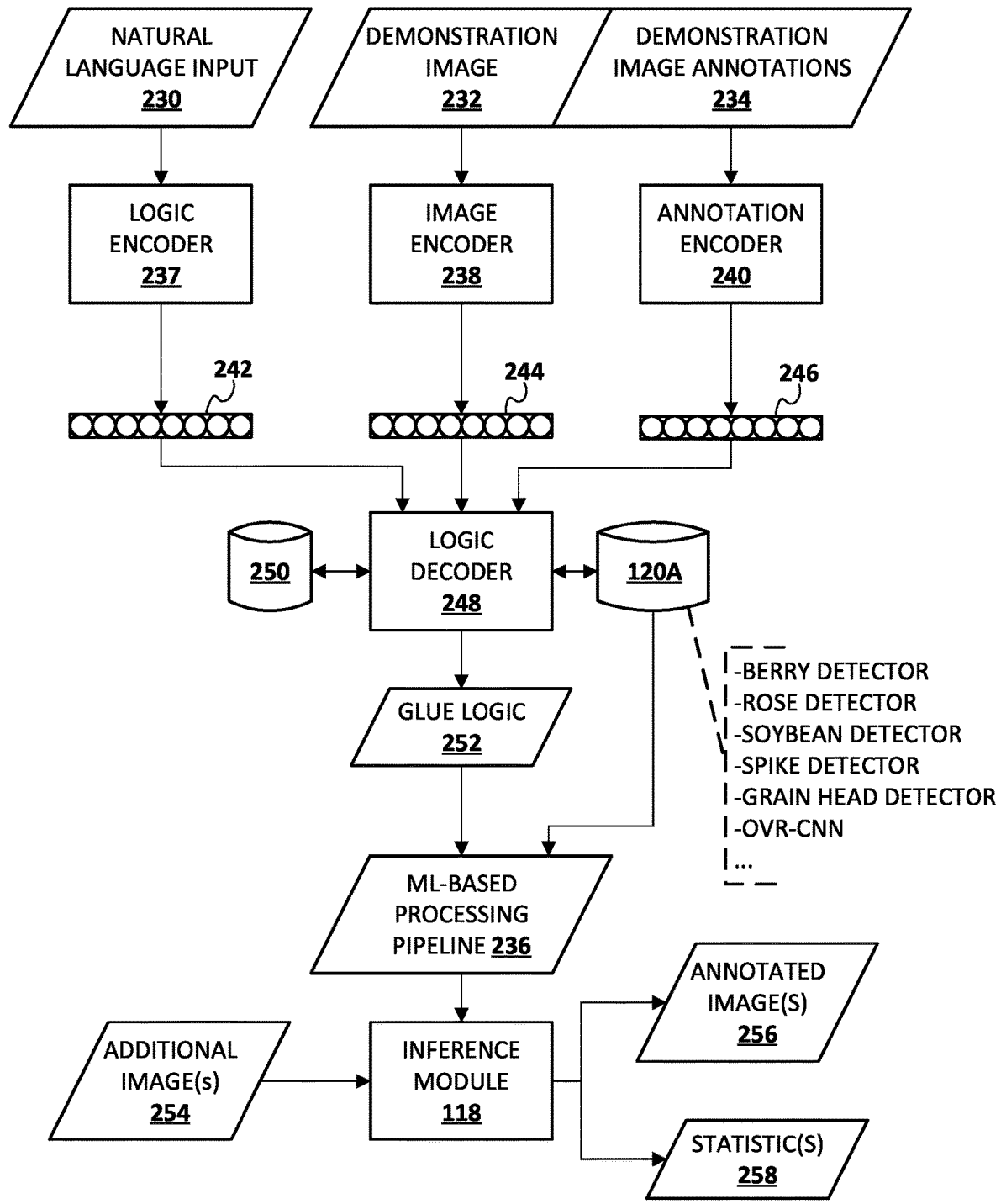
FIG. 2 schematically depicts an example of how various aspects of the present disclosure may be implemented, in accordance with various embodiments.

FIG. 2 schematically depicts an example of how various modalities of input data 230-234 may be processed by ML pipeline module 126 to generate a ML-based processing pipeline 236. Starting at top, natural language input 230, one or more demonstration images 232, and/or one or more demonstration image annotations may be provided. Demonstration image(s) 232 may be captured, for instance, by agricultural equipment 108. Inputs 230-234 are processed by various encoders 237-240 to generate various embeddings 242-246. Embeddings 242-246, which may alternatively be referred to as "vectors," may take various forms, such as continuous embeddings/vectors having various dimensions. Encoders 237-240 may also take various forms, such as encoder portions of encoder-decoder neural networks, transformer networks, convolutional neural networks (CNNs), etc.

Encoders 237-240 include a logic encoder 237 to encode natural language input 230 into a logic embedding 242. Natural language input 230 may describe one or more operations to be performed based on the one or more annotations 234. Consequently, when natural language input 230 is encoded by logic encoder 237, the resulting logic embedding 242 is a reduced dimensionality, yet semantically rich representation of those operations the user wants to have performed. In various implementations, logic encoder 237 may take various forms, such as an encoder configured to perform the word2vec algorithm, an encoder portion of an encoder-decoder network, various types of transformer networks (e.g., Bidirectional Encoder Representations from Transformers, or "BERT"), and so forth.

Encoders 237-240 also include an image encoder 238 that processes all or part(s) of demonstration image(s) 232 using one or more machine learning models (e.g., various types of neural networks such as CNNs, transformers, etc.) to generate image embedding(s) 244. In various implementations, image embedding(s) 244 may be reduced dimensionality, yet semantically rich representations of visual features contained in demonstration image(s). In some implementations, image encoder 238 may generate image embedding(s) 244 by tapping into (or between) one or more layers of a machine learning model (e.g., a CNN backbone) to determine current values based on the currently applied demonstration image 232.

Encoders 237-240 also include an annotation encoder 240 configured to process image annotation(s) 234. Demonstration image annotations 234 may include elements drawn on, assigned to, or otherwise associated with demonstration image(s) 232. These elements may include visual elements such as bounding shapes (e.g., bounding boxes), other drawing primitives such as lines, circles, arcs, rays, etc., semantic segmentations, instance segmentations, etc. Image annotations 234 may also include statistics, tags or labels (e.g., captions), or classifications that may be generated based on and/or assigned to images.

In various implementations, annotation encoder 240 may process these annotations 234 themselves to generate annotation embedding(s) 246. For example, in some implementations, annotation encoder 240 may encode a spatial dimension and/or location of a bounding shape into an annotation embedding 246. Additionally or alternatively, in some implementations, image encoder 238 and annotation encoder 240 may be used together (e.g., cooperatively or as a single component) to process demonstration image(s) 232 and demonstration image annotation(s).

Suppose demonstration image annotation(s) 234 include bounding boxes drawn on demonstration digital image 232. In some implementations, pixels of demonstration image 232 contained within the bounding shape(s) may be processed, e.g., by image encoder 238, to generate, as one or more of the image embeddings 244 and/or annotation embeddings 246, one or more visual feature embeddings representing the visual features depicted by the pixels contained within the one or more bounding shapes.

These visual feature embedding(s) may be used in various ways. In some implementations, the vision feature embedding(s) may be processed using various object recognition techniques (e.g., a multi-object classifier trained to generate a probability distribution over a plurality of different objects) to identify objects depicted by the pixels contained within the bounding shape(s). Once those objects are identified, a matching pretrained object instance recognition machine learning model (e.g., another CNN) may be identified and used to detect instances of the identified object in one or more digital images.

However, it may be the case that object(s) depicted by pixels contained within the bounding shape(s) are not readily identifiable. For example, the user may draw a bounding box around visual features for which the multi-object classifier is unable generate conclusive results (e.g., no single object may have sufficiently high probability), and/or for which there might not be a pretrained object recognition model available. In either case, other techniques may be employed to enable detection of similar visual features in digital image(s), such as weakly supervised learning, zero-shot learning, and/or open-vocabulary object detection using captions may be employed. With open-vocabulary object detection, for instance, an object detector model referred to as an open vocabulary R-CNN (OVR-CNN) is trained using bounding box annotations for a limited set of object categories and image-caption pairs that cover a larger variety of objects. This enables detection and localization of objects for which no bounding box annotation is provided during training.

Referring back to FIG. 2, the various embeddings 242-246 may be processed by a logic decoder 248 using one or more language models 250 to generate glue logic 252.

Language model(s) 250 may take various forms, including various types of multi-modal transformer networks (or ensembles of transformer networks). These transformer networks may include, but are not limited to, the aforementioned BERT model, various versions of the generative pre-trained transformer (GPT) such as GPT3, and so forth. Glue logic 252 may capture/represent/include the operation(s) described in natural language input 230, and may take various forms, such as executable code, source code, scripting code, a sequence of high-level commands, etc.

In some implementations, during processing of embeddings 242-246, logic decoder 248 also may be configured to select (e.g., sample) one or more machine learning models from index 120A that are to be used with glue logic 252 as part of ML-based processing pipeline 236. For example, if the user drew a bounding box around a strawberry and asked to count all strawberries, a strawberry instance recognition CNN may be selected by logic decoder 248 from index 120A and coupled with glue logic 252 in order to form ML-based processing pipeline 236. Non-limiting examples of machine learning models that might be selected by logic decoder 248 and coupled with/incorporated into glue logic 252 based on embeddings 242-246 are depicted in the callout shown in FIG. 2 (e.g., berry detector, rose detector, ..., grain head detector, OVR-CNN).

Inference module 118 may then implement ML-based processing pipeline 236 based on one or more additional digital images 254 to generate one or more annotated images 256 and/or one or more statistics 258. Additional digital image(s) 254 may include, for instance, additional images acquired by agricultural equipment 108. Annotated image(s) 256 may be annotated in a manner that is aligned with how the user annotated demonstration image 232, e.g., with annotations that are similar to demonstration image annotations 234. For example, if the user drew a bounding box around a strawberry and requested a strawberry crop yield prediction, annotated image(s) 256 may include bounding boxes around any detected instances of strawberries. Statistic(s) 258 in such a scenario may include the predicted crop yield, an estimated strawberry count, etc.

Figure 3A:
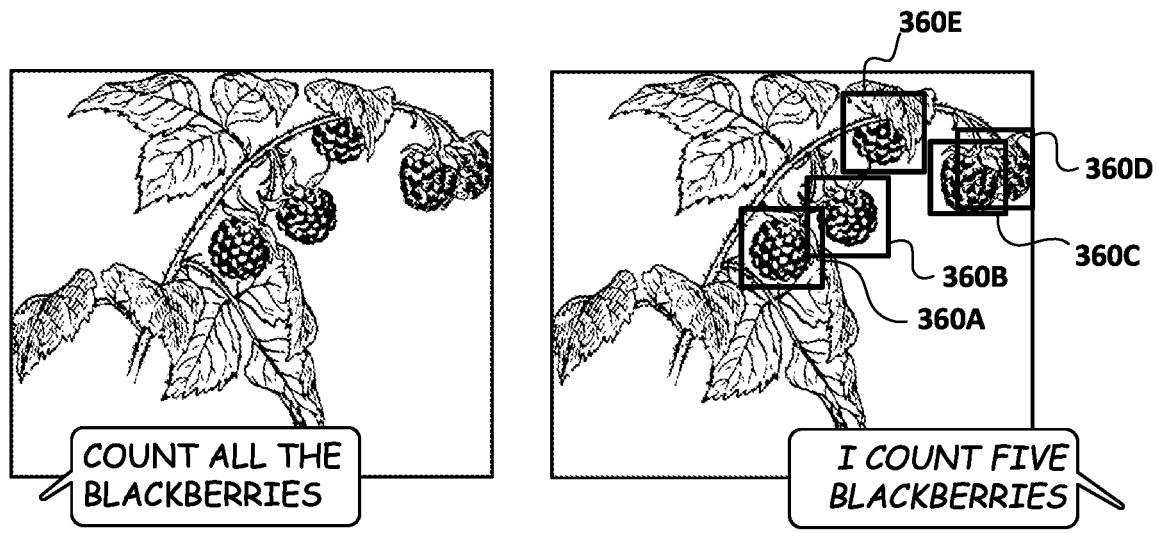
FIG. 3A and FIG. 3B schematically depict an example of how techniques described herein may be implemented in one particular scenario.
Figure 3B:
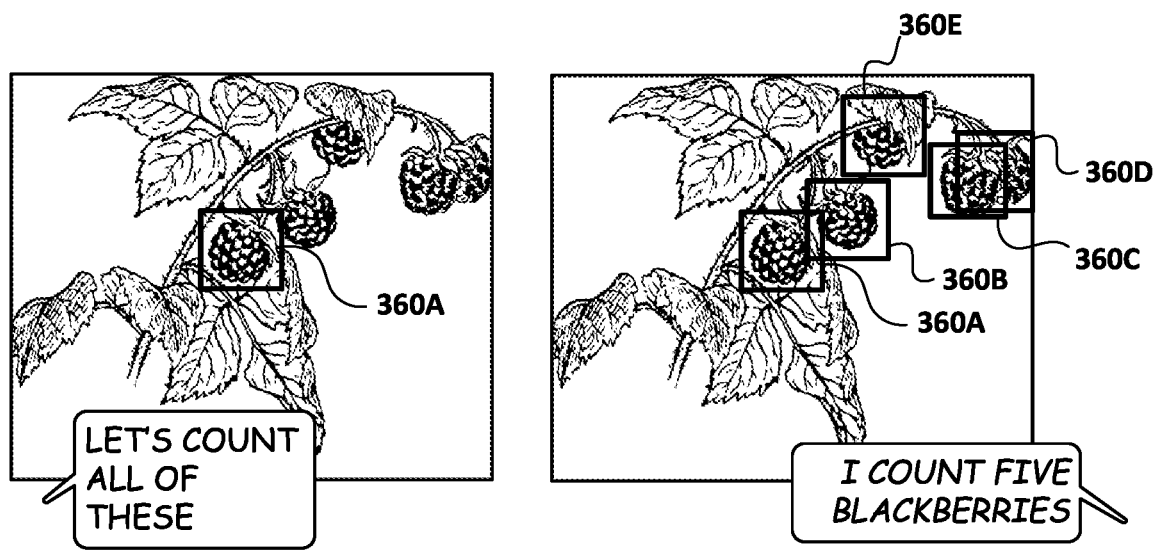

FIGS. 3A and 3B depict an example of how techniques described herein may be implemented. On the left side of FIG. 3A, a demonstration digital image depicts a plant in the *Rubus* genus. A user (not depicted) has provided the natural language input (spoken or typed), "Count all the blackberries." Techniques described herein may be implemented to process the natural language input to determine the user's intent (and hence, generate glue logic 252 that includes a count operation), and to select (e.g., from index 120A) an object instance recognition machine learning model trained to detect and annotate instances of blackberries.

Based on this selected machine learning model and the glue logic 252, a ML-based processing pipeline (236 in FIG. 2) may be generated and executed. The result is shown on the right side of FIG. 3A, where the same demonstration image now includes bounding boxes 360A-E (e.g., annotations of annotated image(s) 256 in FIG. 2), and additional output (e.g., statistic 258 in FIG. 2) is provided in the form of natural language output, "I count five blackberries." In other implementations, the statistic may be output in other ways, such as via additional visual annotation on the demonstration image.

FIG. 3B depicts a variation of the scenario depicted in FIG. 3A. In FIG. 3B, rather than the user including the term "blackberries" in the natural language input, the user is more vague—"Let's count all of these"—and manually draws a bounding box 360A around one of the depicted blackberries. The user's natural language input is processed as before to generate glue logic (252) that includes a count operation. However, instead of identifying a blackberry instance recognition model from the user's natural language input, the blackberry instance recognition model may be identified by processing the pixels contained within bounding box 360A to match the pixels to a "blackberry" object category. For instance, the pixels may be encoded into a visual feature embedding that is then matched to a reference embedding for the "blackberry" object class, e.g., based on a similarity measure/distance in latent space (e.g., cosine similarity, Euclidean distance, etc.), using an image classifier, etc. Otherwise, the resulting ML-based processing pipeline may be substantially similar to that generated in FIG. 3A. The resulting annotated image on the right side of FIG. 3B is identical to that depicted in FIG. 3A.

Notably, in FIG. 3B, had the user drawn bounding box 360A around visual features for which existing object instance recognition models were not available, the pixels contained within bounding box 360A could nonetheless have been processed, e.g., using the aforementioned OVR-CNN, to enable recognition of a new object category. Similar instances of that new object category (i.e. similar visual features) may then be detected in image(s). Additionally or alternatively, in some implementations, pixels contained within the bounding box depicting a first instance of a plant-part-of-interest to the user may be encoded as a first visual feature embedding. Similarity measures may then be calculated between the first visual feature embedding and a plurality of candidate visual feature embeddings that encode pixels contained in a plurality of candidate bounding shapes annotating one or more digital images. These candidate bounding shapes may be selected randomly, as a grid, etc. Based on the similarity measures, one or more of the candidate bounding shapes may be identified as surrounding additional instance(s) of the plant-part-of-interest.

Figure 4A:
FIG. 4A and FIG. 4B schematically depict another example of how techniques described herein may be implemented in another particular scenario.
Figure 4A:
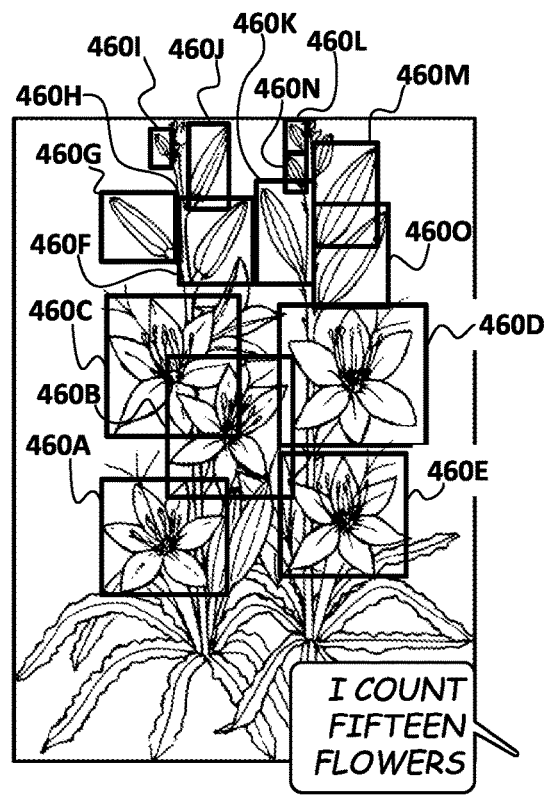
Figure 4B:
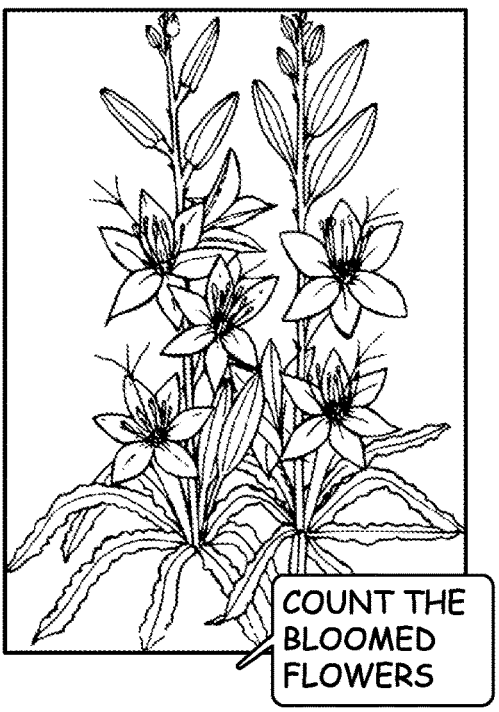
Figure 4B:
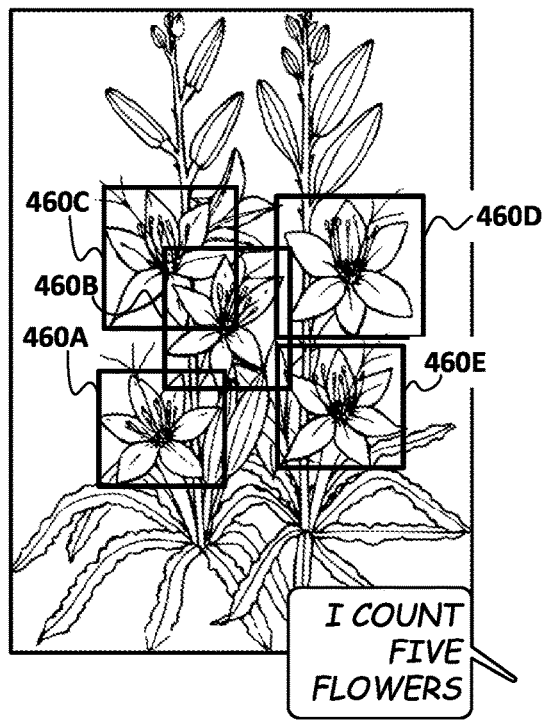

FIGS. 4A and 4B depict additional examples. In FIG. 4A, the demonstration image at left depicts a plant having multiple flowers in various stages of growth, include unbloomed buds and bloomed flowers. In this example, the user provides natural language input, "Count the flowers." A ML-based processing pipeline may be generated that includes an object instance recognition model trained to detect all flowers, regardless of their growth stage. As a result of executing this ML-based processing pipeline, the image on the right includes annotations 460A-O of all detected instances of flowers. Additionally, the following output is provided: "I count fifteen flowers." This may not be what the user intended, however. For instance, the user may be interested in bloomed flowers only.

Accordingly, in FIG. 4B, the user provides a new natural language request, "Count the bloomed flowers." Assuming there exists an object instance recognition model trained to detect bloomed flowers, it may be selected and used with glue code that includes a count operation to generate a new ML-based processing pipeline. This new ML-based processing pipeline may be executed to cause the image to include annotations 460A-E, and to cause the output, "I count five flowers."

Figure 5A:
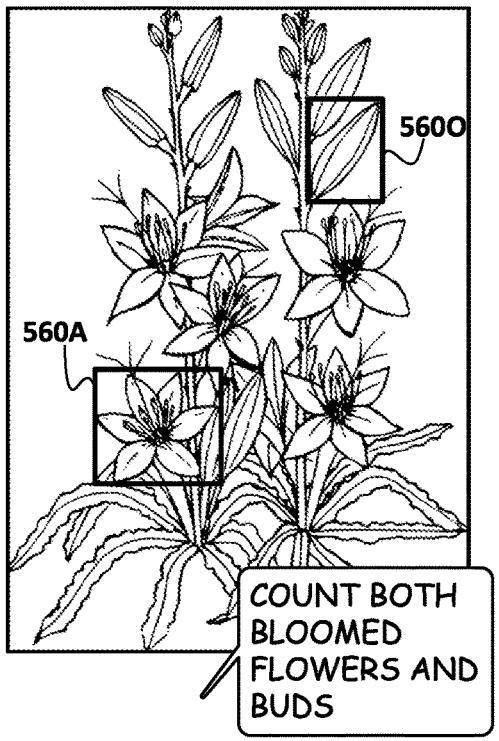
FIG. 5A and FIG. 5B schematically depict another example of how techniques described herein may be implemented in another particular scenario.
Figure 5A:
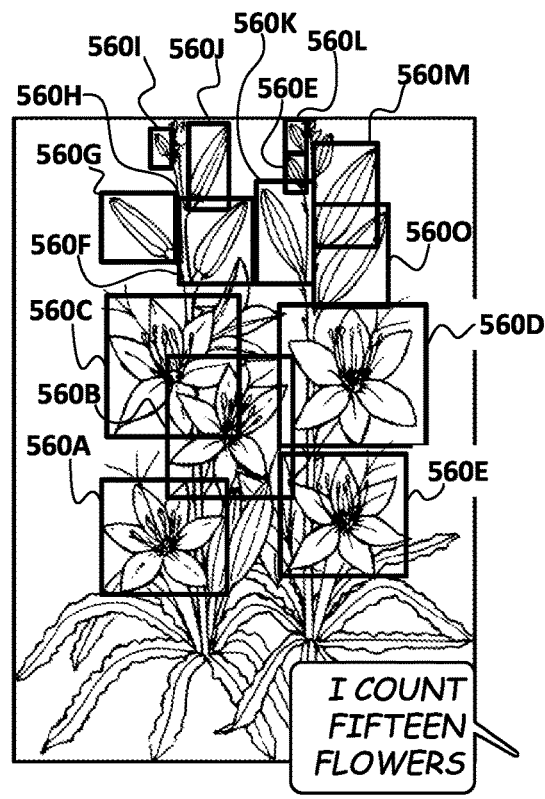
Figure 5B:
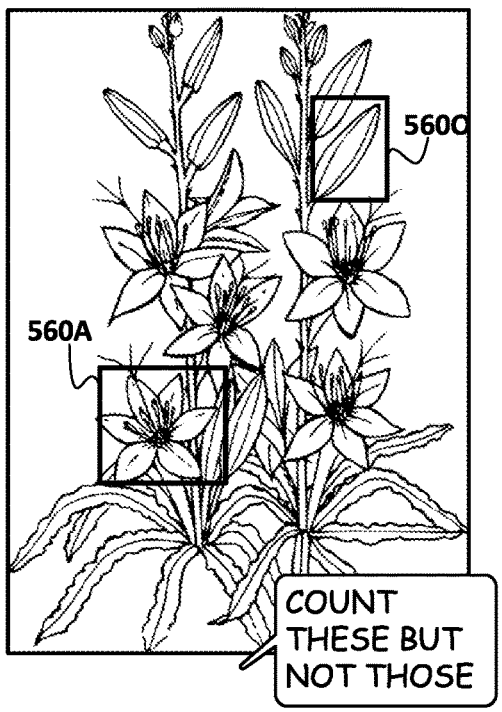
Figure 5B:
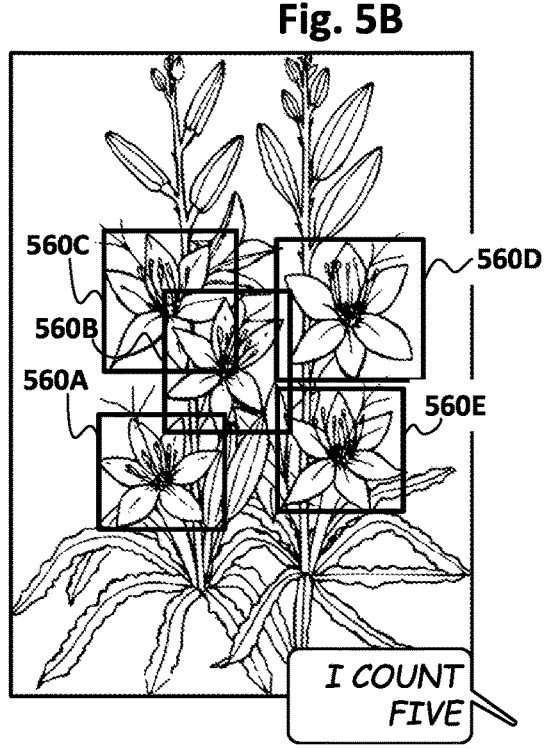

FIGS. 5A-B depict variations of the scenario demonstrated in FIGS. 4A-B. In FIG. 5A, the user provides natural language input, "Count both bloomed flowers and buds." Assuming object instance recognition models exist for both buds and blooms, a ML-based processing pipeline may be assembled that includes a count operation coupled with both models. When executed, the ML-based processing pipeline may cause annotations 560A-0 to be generated, along with the output, "I count fifteen flowers."

FIG. 5A is an example where the operations described in the natural language input include identifying instances of objects depicted in digital image(s) that are members of a union of multiple object classes. It is also possible for natural language input to request objects contained in an intersection of two objects classes. For example, a user could request a "count of all ripe strawberries that are at least 2 cm wide." If one set contains ripe strawberries and another set contains strawberries at least 2 cm wide, the intersection of these two sets would satisfy the user's request.

In FIG. 5B, the user provides the natural language input, "Count these but not those." At the same time, the user draws a first bounding box 560A around a bloomed flower ("these") and a second bounding box 4600 around a bud ("those"). Logic decoder 248 may generate glue logic 252 that uses, for instance, a flower object instance recognition model to detect a set of instances of flowers, whether bloomed or in bud form. Then, one or more other object instance recognition models, e.g., an OVR-CNN that is conditioned on the spot to detect buds, may be used to detect a second set of instances of visual features similar to what is depicted in bounding box 5600. Then, the second set may be subtracted from the first set, leaving only the instances of bloomed flowers. The result may be the image on the right in FIG. 5B, where annotations 560A-E are provided for bloomed flowers, and no annotations are provided for buds. Likewise, the output at right is "I count five."

User-provided demonstration image annotations 234 are not limited to bounding shapes. For example, a user who is interested in a relationship between two or more visual plant features may draw or otherwise provide demonstration image annotations 234 that include two (or more) reference points—which may be single points, bounding shapes, other drawing primitives, etc.—that correspond to (e.g., overlay, identify) the two or more visual features depicted in demonstration digital image 232. For example, the user may provide natural language output that identifies one or more operations for determining a distance between the two visual features depicted in the demonstration digital image that are referenced by the two reference points. Additionally or alternatively, the user may provide an additional annotation indicative of their intent to measure this distance, such as a line drawn between the reference point.

Figure 6:
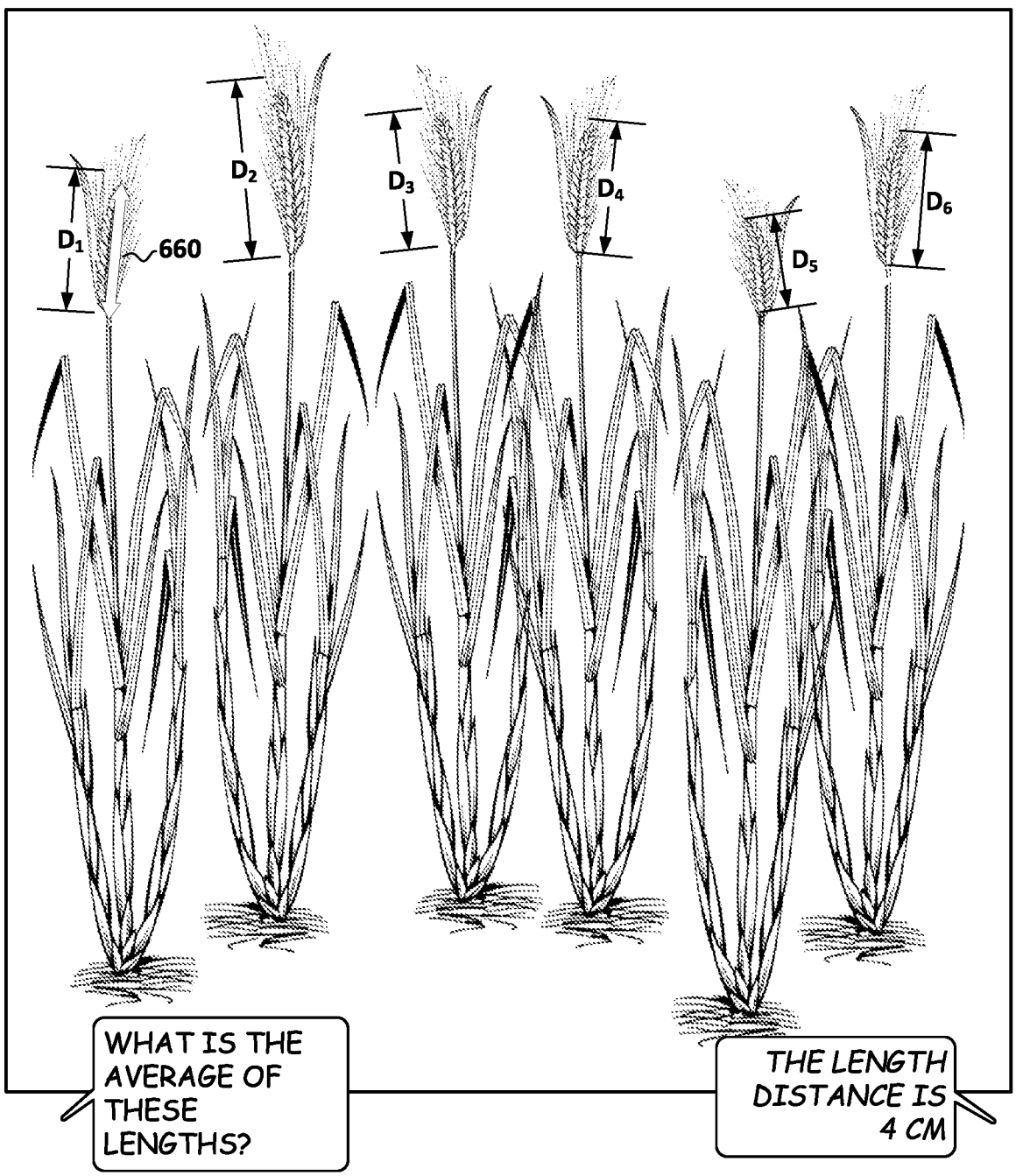
FIG. 6 depicts another example of how techniques described herein may be implemented.

An example of this is depicted in FIG. 6. In this example, a demonstration image depicts a plurality of wheat plants. A user has drawn an annotation 660 on the demonstration image between the top and bottom of a plant-part-of-interest to the user, here, a wheat head. The user also provides the natural language input, "What is the average of these lengths?" In this example, the reference points may be the ends of the annotation 660 drawn by the user.

In various implementations, visual features depicted by pixels in the areas of these reference points may be encoded into visual feature embeddings. For example, bounding shapes may be formed automatically at some predetermined or calculated perimeter around the reference points, e.g., with the reference points at the center (these bounding shapes need not be drawn on the image). These visual feature embeddings may then be used as described previously to select one or more existing object instance recognition models if available. Or, if no object instance recognition model(s) are available (e.g., have not been trained or are not included in the user's subscription) for the tops or bottoms of wheat heads, an OVR-CNN model may be conditioned/extended to detect additional instances of the same visual features (i.e., wheat head tops and wheat head bottoms).

Whichever the case, glue logic 252 may be generated based on the user's natural language input and/or based on annotation 660. This glue logic 252 may include operations for measuring distances between reference points in images (e.g., in pixels, or in real distance units if range data or reference measurements (e.g., a ruler adjacent the plant in the image) is available) and for calculating the average of these distances. This glue logic 252 may be coupled with the object instance recognition models to form a ML-based processing pipeline (236 in FIG. 2). Executing this pipeline may result in the distances D1-D6 depicted in FIG. 6 being measured and annotated on the demonstration image as shown. In addition, statistic(s) (258 in FIG. 2) responsive to the user's natural language input, such as "The average length is 4 cm," is provided, audibly or visually.

Figure 7:
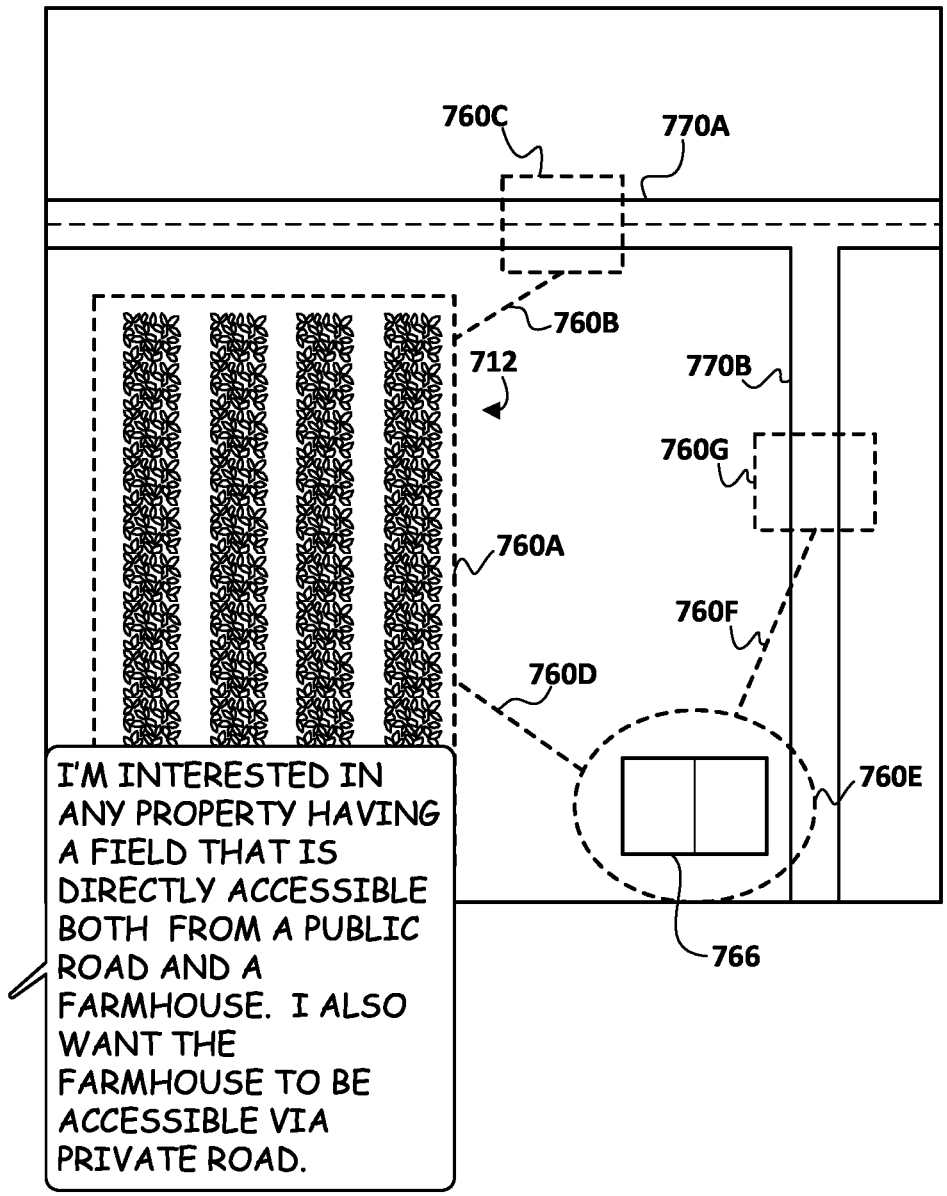
FIG. 7 depicts another example of how techniques described herein may be implemented.

FIG. 7 schematically depicts another example of how techniques described herein may be leveraged to generate an ad hoc ML-based processing pipeline. In FIG. 7, the demonstration image is an overhead image depicting a farm. The image depicted in FIG. 7 may be a portion of a larger satellite image that depicts a larger geographic area, for instance. The farm includes a field 712 and a farmhouse 766, as well as a public road 770A and a private road (no line markings) 770B connected to public road 770A.

A user has provided the following natural language input: "I'm interested in any property having a field that is directly accessible both from a public road and a farmhouse. I also want the farmhouse to be accessible via private road." Contemporaneously with making this statement, the user draws annotations 760A-G. The user draws annotation 760A to correspond to the term "field" in the user's natural language input and takes the form of a bounding box around field 712. The user draws annotations 760B and 760D to convey the user's desire that the field be "directly accessible" from both a public road (annotated with 760C) and a farmhouse (annotated with 760E). Additionally, the user draws annotation 760F to convey the user's desire that the farmhouse be accessible via a private road (annotated with 760G).

These annotations may be processed, e.g., by annotation encoder 240, to generate annotation embedding(s) 246. In some implementations, these annotations are interpreted by annotation encoder 240 as a graph. Consequently, annotation encoder 240 may generate annotation embedding(s) 246 using a machine learning model that is trained to process graph input, including various types of graph neural networks (GNNs), such as graph convolutional networks (GCNs), graph attention networks (GATs), etc. Annotation embedding(s) 246 may be used by logic decoder 248 with the other embeddings 242-244 as described previously to generate a ML-based processing pipeline. This particular ML-based processing pipeline may be configured to identify, e.g., in high elevation images such as satellite images, drone images, etc., similar farms: those with fields directly accessible from both a public road and a farmhouse, and where the farmhouse is accessible via a private road.

Figure 8:
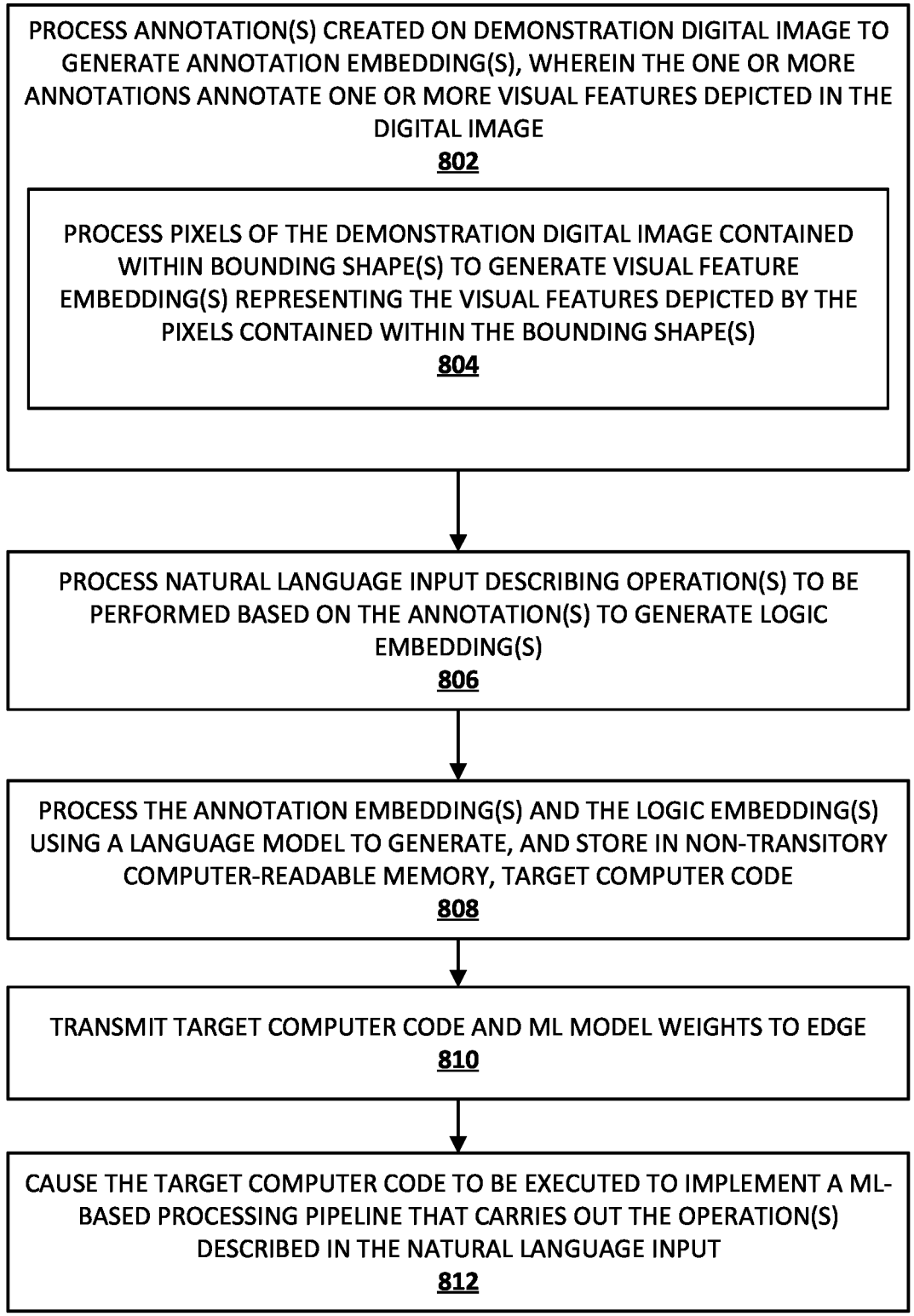
FIG. 8 is a flowchart of an example method in accordance with various implementations described herein.

FIG. 8 illustrates a flowchart of an example method 800 for practicing selected aspects of the present disclosure. For convenience, operations of method 800 will be described as being performed by a system configured with selected aspects of the present disclosure. Other implementations may include additional operations than those illustrated in FIG. 8, may perform operation(s) of FIG. 8 in a different order and/or in parallel, and/or may omit one or more of the operations of FIG. 8.

Referring to FIGS. 8 and 2, at block 802, the system, e.g., by way of annotation encoder 240, may process one or more annotations 234 created on a demonstration digital image 232 to generate one or more annotation embeddings 246. The one or more annotations 234 may annotate one or more visual features depicted in the demonstration digital image 232. As noted previously, annotations 234 may come in various forms, such as bounding shapes, various drawing primitives, text (handwritten on a touchscreen or typed), call outs, and so forth.

In some implementations where the annotations 234 take the form of one or more bounding shapes, the processing of block 802 may include, at block 804, processing pixels of the demonstration digital image contained within the bounding shape(s) to generate visual feature embedding(s). These visual feature embedding(s) may represent the visual features that are depicted by pixels contained within the bounding shape(s). These visual feature embedding(s) may then be used for purposes such as identifying suitable object instance recognition models, expanding OVR-CNN models to new object classes, etc.

At block 806, the system, e.g., by way of logic encoder 237, may process natural language input 230 describing one or more operations to be performed based on the one or more annotations 234 to generate one or more logic embeddings 242. For example, the tokens of the natural language input may be encoded using an algorithm such as word2vec, and the resulting embeddings may be processed using logic encoder 237, e.g., using a language model such as a transformer network, to generate logic embedding 242 that represents the semantics of the natural language input 230.

At block 808, the system, e.g., by way of logic decoder 248, may process the one or more annotation embeddings 246 and the one or more logic embeddings 242 using a language model 250 to generate, and store in non-transitory computer-readable memory, target computer code (more generally, glue logic 252). In some implementations, the one or more annotation embeddings 246 and the one or more logic embeddings 242 may be processed by the language model as a sequence of embeddings. In other implementations, the embeddings 242 and 246 may be combined, e.g., using concentration, averaging, etc., and then processed by logic decoder 248. The target computer code may at least partially implement a ML-based processing pipeline 236 that performs the one or more operations based on the one or more annotations 234.

In some implementations, the ML-based processing pipeline may be generated at the cloud, e.g., using the relatively unconstrained resources of the cloud. In such embodiments, at block 810, the system may transmit the target computer code and ML model weights to the edge. At block 812, the system, e.g., by way of edge inference module 118B, may cause the target computer code to be executed to carry out the one or more operations described in the natural language input.

Figure 9:
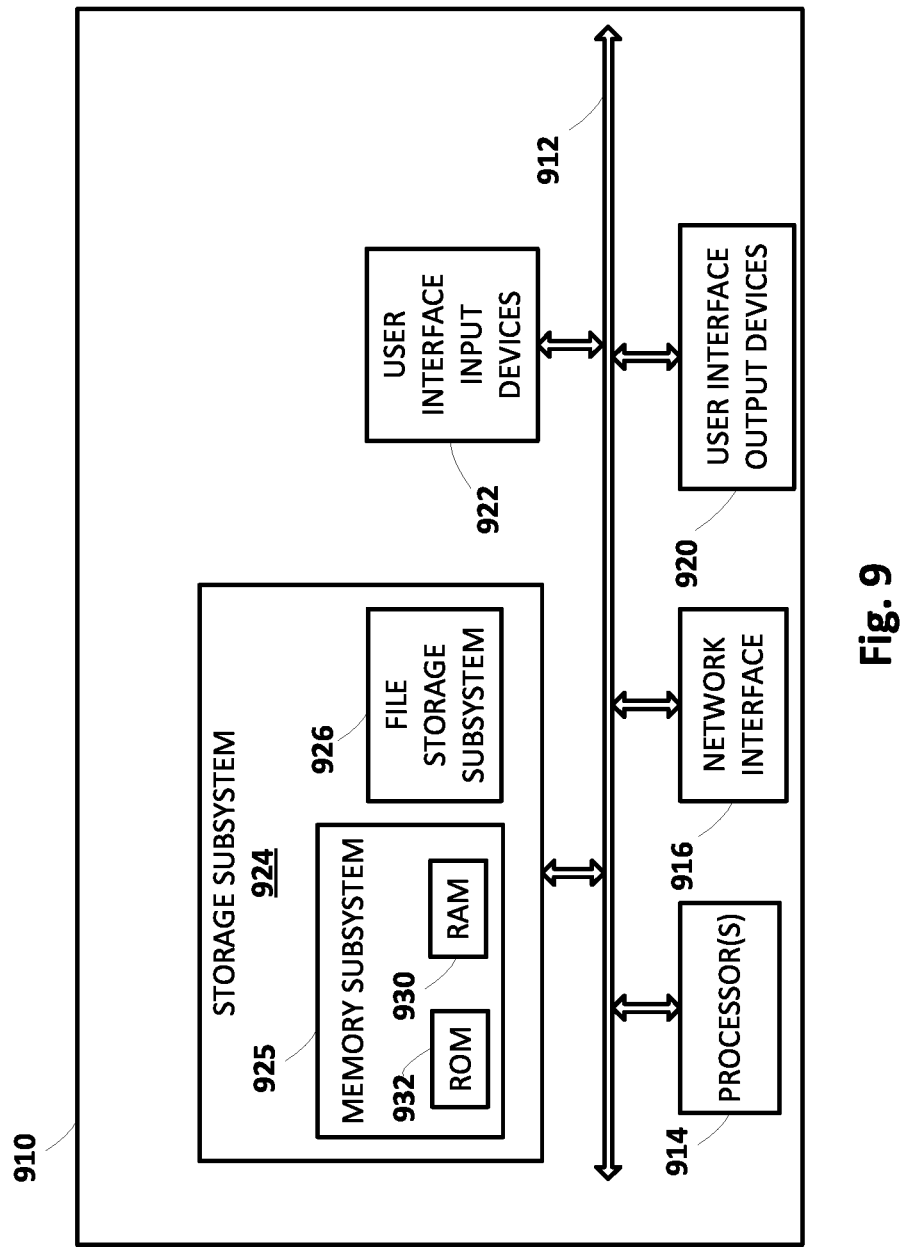
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 910 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method 800 described herein, as well as to implement various components depicted in FIGS. 1-2.

These software modules are generally executed by processor 914 alone or in combination with other processors. Memory 925 used in the storage subsystem 924 can include a number of memories including a main random-access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
    processing one or more annotations created on a demonstration digital image to generate one or more annotation embeddings, wherein:
        the demonstration digital image comprises a plant and a plurality of plant parts of interest for the plant,
        each of the one or more annotations annotate one or more visual features of the plant depicted in the demonstration digital image,
        each of the one or more visual features correspond to at least one plant part of interest of the plurality for the plant;
        the one or more annotations comprise a first annotation, the first annotation distinguishing a first plant part of interest of the plurality having a first visual feature; and
        the one or more annotations comprise a second annotation, the second annotation distinguishing a second plant part of interest having a second visual feature;
    processing natural language input describing one or more operations to be performed based on the one or more annotations to generate one or more logic embeddings, wherein the processing comprises:
        determining a combination feature using the first annotation and the second annotation, the combination feature representing a union or an intersection of the first visual feature and the second visual feature; and
        identifying one or more additional plant parts having the combination feature; and
    processing the one or more annotation embeddings and the one or more logic embeddings using a language model to train a machine learning based processing pipeline comprising target computer code;
    wherein the target computer code implements the machine learning based processing pipeline that performs the one or more operations based on the one or more annotations.

2. The method of claim 1, further comprising causing the target computer code to be executed to carry out the one or more operations described in the natural language input.

3. The method of claim 1, wherein the language model comprises a multi-modal transformer.

4. The method of claim 1, wherein the one or more annotation embeddings and the one or more logic embeddings are processed by the language model as a sequence of embeddings.

5. The method of claim 1, wherein the one or more annotations comprise one or more bounding shapes drawn on the demonstration digital image, and processing the one or more annotations comprises:
    processing pixels of the demonstration digital image contained within the one or more bounding shapes to generate, as one or more of the annotation embeddings, one or more visual feature embeddings representing the visual features depicted by the pixels contained within the one or more bounding shapes.

6. The method of claim 1, wherein processing the one or more annotations comprises encoding a spatial dimension and location of a bounding shape as one of the annotation embeddings.

7. The method of claim 1, wherein the one or more annotations comprise two reference points of the demonstration digital image that correspond to two of the visual features depicted in the demonstration digital image, and the one or more operations comprise determining a distance between the two of the visual features depicted in the demonstration digital image that are referenced by the two reference points.

8. The method of claim 7, wherein the two reference points are annotated using a line drawn between them.

9. The method of claim 1, wherein:
    the first annotation comprises a first bounding shape surrounding an instance of a first object class depicted in the demonstration digital image;
    the second annotation comprises a second bounding shape surrounding an instance of a second class depicted in the demonstration digital image; and
    the combination feature is the union or the intersection of the first and second object classes.

10. The method of claim 1, wherein the one or more annotations comprise a bounding shape surrounding a first instance of a plant-part-of-interest depicted in the demonstration digital image, and the one or more operations comprise:
    detecting one or more additional instances of the plant-part-of-interest across one or digital images, and
    annotating the detected additional instances of the plant-part-of-interest with additional bounding shapes.

11. The method of claim 10, wherein the one or more operations further comprise determining a statistic about the additional instances of the plant-part-of-interest based on spatial dimensions of the additional bounding shapes.

12. The method of claim 10, wherein detecting the one or more additional instances of the plant-part-of-interest across one or more digital images comprises:
    encoding pixels of the demonstration digital image contained within the bounding shape that depict the first instance of the plant-part-of-interest as a first visual feature embedding;
    calculating similarity measures between the first visual feature embedding and a plurality of candidate visual feature embeddings that encode pixels contained in a plurality of candidate bounding shapes annotating the one or more digital images; and based on the similarity measures, identifying one or more of the candidate bounding shapes as surrounding the one or more additional instances of the plant-part-of-interest.

13. A system comprising one or more processors and memory storing instructions that, in response to execution by the one or more processors, cause the one or more processors to:
process one or more annotations created on a demonstration digital image to generate one or more annotation embeddings, wherein:
the demonstration digital image comprises a plant and a plurality of plant parts of interest for the plant,
each of the one or more annotations annotate one or more visual features of the plant depicted in the demonstration digital image,
each of the one or more visual features correspond to at least one plant part of interest of the plurality for the plant;
the one or more annotations comprise a first annotation, the first annotation distinguishing a first plant part of interest of the plurality having a first visual feature; and
the one or more annotations comprise a second annotation, the second annotation distinguishing a second plant part of interest having a second visual feature;
process natural language input describing one or more operations to be performed based on the one or more annotations to generate one or more logic embeddings, wherein the processing comprises:
determining a combination feature using the first annotation and the second annotation, the combination feature representing a union or an intersection of the first visual feature and the second visual feature; and
identifying one or more additional plant parts having the combination feature; and
process the one or more annotation embeddings and the one or more logic embeddings using a language model to train a machine learning based processing pipeline comprising target computer code;
wherein the target computer code implements the machine learning based processing pipeline that performs the one or more operations based on the one or more annotations.

14. The system of claim 13, further comprising instructions to cause the target computer code to be executed to carry out the one or more operations described in the natural language input.

15. The system of claim 13, further comprising causing the target computer code to be executed to carry out the one or more operations described in the natural language input.

16. The system of claim 13, wherein the one or more annotation embeddings and the one or more logic embeddings are processed by the language model as a sequence of embeddings.

17. The system of claim 13, wherein the one or more annotations comprise one or more bounding shapes drawn on the demonstration digital image, and the instructions to process the one or more annotations comprise instructions to;

process pixels of the demonstration digital image contained within the one or more bounding shapes to generate, as one or more of the annotation embeddings, one or more visual feature embeddings representing the visual features depicted by the pixels contained within the one or more bounding shapes.

18. The system of claim 13, wherein the instructions to process the one or more annotations comprise instructions to encode a spatial dimension and location of a bounding shape as one of the annotation embeddings.

19. The system of claim 13, wherein the one or more annotations comprise two reference points of the demonstration digital image that correspond to two of the visual features depicted in the demonstration digital image, and the one or more operations comprise determining a distance between the two of the visual features depicted in the demonstration digital image that are referenced by the two reference points.

20. At least one non-transitory computer-readable medium comprising instructions that, when executed by one or more processors, cause the one or more processors to:
process one or more annotations created on a demonstration digital image to generate one or more annotation embeddings, wherein:
the demonstration digital image comprises a plant and a plurality of plant parts of interest for the plant,
each of the one or more annotations annotate one or more visual features of the plant depicted in the demonstration digital image,
each of the one or more visual features correspond to at least one plant part of interest of the plurality for the plant;
the one or more annotations comprise a first annotation, the first annotation distinguishing a first plant part of interest of the plurality having a first visual feature; and
the one or more annotations comprise a second annotation, the second annotation distinguishing a second plant part of interest having a second visual feature;
process natural language input describing one or more operations to be performed based on the one or more annotations to generate one or more logic embeddings, wherein the processing comprises:
determining a combination feature using the first annotation and the second annotation, the combination feature representing a union or an intersection of the first visual feature and the second visual feature; and
identifying one or more additional plant parts having the combination feature; and
process the one or more annotation embeddings and the one or more logic embeddings using a language model to train a machine learning based processing pipeline comprising target computer code;
wherein the target computer code implements the machine learning based processing pipeline that performs the one or more operations based on the one or more annotations.

* * * * *